Figure 1:
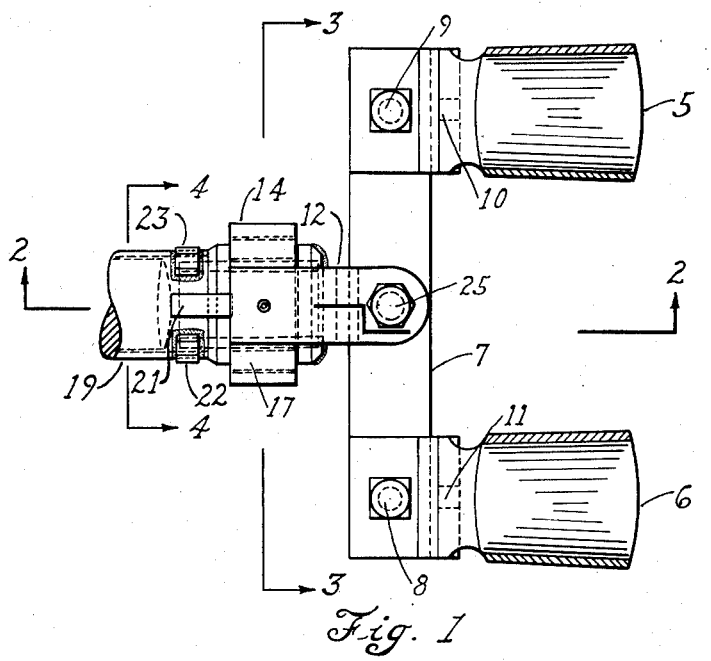

Sept. 9, 1952     J. E. TONG ET AL     2,610,263
CURRENT COLLECTOR

Filed March 22, 1949     2 SHEETS—SHEET 1

INVENTORS
JERRY E. TONG
MIKE McBILES

By Ernest V. Haines
Attorney

INVENTORS
JERRY E. TONG
MIKE McBILES

By Ernest V. Haines
Attorney

Patented Sept. 9, 1952

2,610,263

UNITED STATES PATENT OFFICE 2,610,263

CURRENT COLLECTOR

Jerry E. Tong and Mike McBiles, Carlsbad, N. Mex.; said Tong assignor to International Minerals & Chemical Corporation, a corporation of New York Application March 22, 1949, Serial No. 82,862

2 Claims. (Cl. 191—57)

This invention relates to a current collector for trolley-operated vehicles wherein the current is supplied by two or more overhead wires. It has particular reference to current collecting assemblies used on mining vehicles or similar heavy-duty equipment wherein a single trolley pole and two or more collecting members such as wheels or shoes are employed.

The use of trolley-operated vehicles in operations such as mining is limited because of the difficulty experienced in maintaining continuous contact between the current collector and the overhead wires which supply the source of electricity necessary to operate the vehicle. The primary reason for the difficulty in maintaining continuous contact with the overhead wires is due to the fact that the vertical distances between each of the overhead wires and the roadbed or track over which the vehicle must travel are unequal. This may be due to a variety of factors such as the unequal tension on the overhead wires, unevenness of the roof of the drift or crosscut supporting the wires, or the roughness of the terrain over which the vehicle must travel. This result generally obtains even though the current collector is initially held against the wire by means of tension supplied by a spring connected from the vehicle directly to the trolley pole carrying the current collector. The result also obtains even though the contacting members are allowed to turn in a plane substantially horizontal to the earth. This latter feature, however, must be embodied in a current collector assembly to enable continuous contact to be maintained while the trolley-operated vehicle is rounding a curve or traveling other than in a substantially straight line. The contacting elements must remain substantially parallel to a plane drawn between the overhead wires in order to allow contact to be maintained.

The principal object of this invention is to provide a current collector for trolley-operated vehicles which will remain in continuous contact with overhead trolley wires even though the vertical distances between each of the overhead wires and the roadbed over which the vehicle operates are unequal at any given point.

A further object of this invention is to provide a current collector for trolley-operated mining and similar heavy-duty vehicles which will remain in continuous contact with the overhead trolley wires while upward pressure is applied to the collector which is in contact with said wires.

By means of the present invention, the current collector, consisting of two metal shoes attached to a rigid member of nonconducting material such as wood, is attached to a trolley pole. The pole, in turn, is attached to a spring which, in turn, is connected to the vehicle. Thus, when the trolley pole is placed in its fitting on the vehicle, the tension applied by the spring holds the current collector assembly on the other end of the trolley pole against the overhead trolley wires. In addition to allowing the current collector assembly to move in a horizontal arc with relation to the ground when placed in this operating position, the present invention also allows the contacting members to move in an arc that is substantially vertical to the earth by interposing a sleeve bearing assembly between the bar of nonconducting material and the trolley pole. Contact by the current collector assembly is thus continuously maintained with the overhead trolley wires, even though the vertical distance between each of the overhead trolley wires and the roadbed is unequal at any given point. The extent of this vertical movement is limited by a bar extending between two lugs. The bar and lugs are respectively termed "torsion stop bar" and "torsion control lugs." The distance between the latter may be made variable, thereby allowing the current collector assembly to rotate in a vertical arc of any desired length. The length of the vertical arc may also be varied by varying the width of the torsion stop bar.

Figure 2:
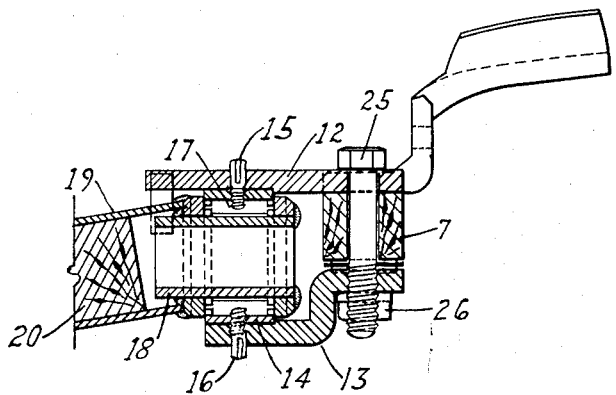
Figure 3:
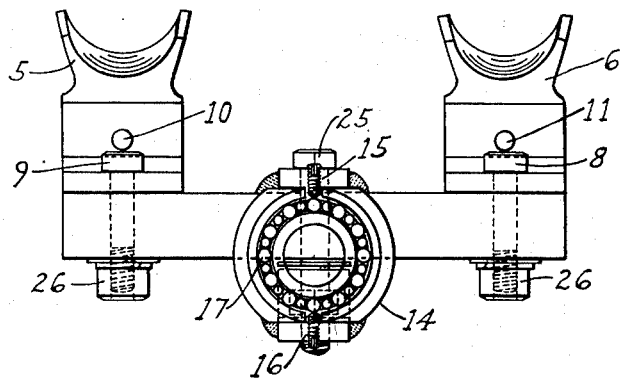
Figure 4:
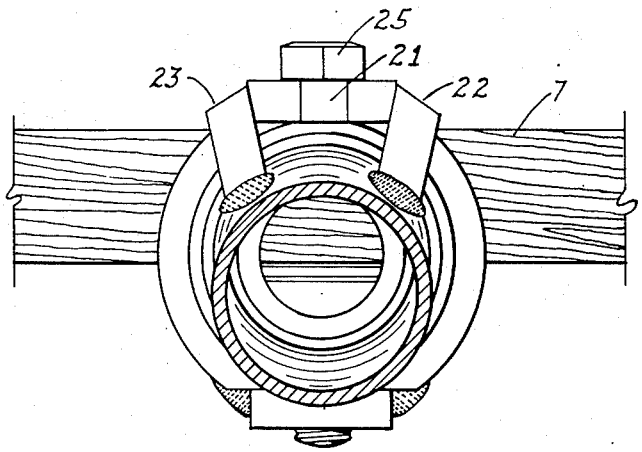

For a clearer understanding of this invention and the attainment of its objects, reference may be had to the following detailed description and the accompanying drawings in which Figure 1 is a plane view of the apparatus with the section line numbers 2 to 4 indicating the views represented by the remaining figures. Figure 2 is a vertical section through the section line 2—2 of Figure 1. Figure 3 is a cross section through the section line 3—3 of Figure 1 at the bearing which allows vertical rotary motion of the contact members. Figure 4 is an end view from the hollow metal shaft which attaches to a trolley pole (not shown) as illustrated by section line 4—4 of Figure 1.

As shown in Figures 1 and 2, the metallic conducting shoes 5 and 6, having inner surfaces which are concave, serve as contact members. Those skilled in the art will readily perceive that although the inherent shape of the metal shoes is varied, the principle of this invention may still be employed. Therefore, it is not intended to limit this invention to the shape of these contact members as previously described except that they should be of the shape most desirable for maintaining contact with the overhead wires. The metal shoes are attached to a bar 7 made of nonconducting material such as wood at a distance of approximately that between the overhead trolley wires. The bolts 8 and 9 and nuts 26 used to fasten the shoes to the wooden bar also serve as terminals for the wires which are led through the ports 10 and 11, in the shoes, down the trolley pole, and to the motor of the vehicle.

As shown in Figures 1 and 2, the nonconducting bar 7 is pivotally fastened at its center to a metal shank 12 by means of a bolt 25 which is substantially smaller in diameter than that of the hole through which it passes. Thus, the bar is allowed to freely pivot in a position substantially horizontal to the earth. Several modifications of this feature will occur to those skilled in the art, such as replacing the bolt and hole through which it passes with a steel shaft and a bearing. Bolt 25 is passed through the bar 7 and an S-shaped shank 13. A metal collar 14 is fastened between the aforesaid metal shanks by means of set screws 15 and 16. This connection may also be made by welding or similar means.

The metal collar 14, along with the collector assembly thus far described, is left free to rotate in a plane substantially vertical to the earth on a sleeve bearing 17 as illustrated in Figures 1, 2, and 3. The bearing rides on one end of a stationary metal shaft 18 which is welded or connected by other means at a slight angle to a hollow metal shaft 19. The hollow metal shaft 19, in turn, is affixed to a wooden trolley pole 20. The unit comprising the metal collar 14, sleeve bearing 17, stationary metal shaft 18, and the hollow metal shaft 19 is designated in the claims as the "sleeve bearing assembly."

The circular motion of the collector assembly in a plane substantially vertical to the earth is limited by means of a torsion stop 21 which projects from metal shank 12 and/or metal collar 14 of the collection assembly between two metal torsion control lugs 22 and 23 located on the hollow metal shaft 19. By this device, the collector assembly may rotate in the vertical position only until the torsion stop 21 strikes one or the other torsion control lugs 22 and 23. The distance through which the collector assembly may rotate is thus controlled by the distance between these torsion control lugs or by the width of the torsion stop bar, or both. In Figure 4, the position of the torsion control lugs 22 and 23 are shown permanently affixed to the steel shaft; however, this distance may be made variable by bolting the lugs through slots in the hollow metal shaft 19 referred to previously. The torsion stop 21 is shown centered between the torsion control lugs, both in Figures 1 and 4. Thus, when the current collector assembly is held in an operating position against the overhead wires, continuous contact is maintained even though the vertical distance of each of the overhead wires and the roadbed is unequal, since the vertical movement of the current collector compensates for this difference in vertical distance.

The foregoing description is intended merely as an illustration of the principle involved and not in any way a limitation thereon. Having fully described the invention, what is desired to be secured by Letters Patent is:

1. A current collector for supplying electrical current and adapted to contact two overhead wires for trolley equipped vehicles which comprises, two metal conducting shoes whose contact surfaces are concave, secured to a bar of nonelectrical conducting material and spaced at a distance substantially equal to that distance between the overhead wires, said bar being connected at its approximate center to spaced shank members by a pivotal connection, a trolley pole, a sleeve bearing positioned to permit rotation in the vertical plane having one member connected to said pole and the member free-to-rotate connected to said shank members and torsion stop means affixed to the member of said sleeve bearing which is free to rotate and extending between torsion control lugs positioned on the nonrotatable portion of said sleeve bearing.

2. A current collector for supplying electric current and adapted to contact two overhead wires for trolley-equipped vehicles, which comprises two metallic conducting shoes, whose contacting surfaces are concave, secured to a bar of nonelectrical conducting material and spaced at a distance substantially equal to that distance between the overhead wires, said bar being fastened at its approximate center intermediate a straight shank and an S-shaped shank by means of a bolt whose diameter is substantially smaller than the hole in the center of the nonconducting material through which the bolt passes, said steel shanks being affixed to a metal collar which houses a sleeve bearing, the interior surfaces of which ride on one end of a nonrotating steel shaft, the other end of said steel shaft being connected to a trolley pole, thereby maintaining said shoes in spaced relationship substantially parallel to the overhead wires and permitting vertical adjustment of said metal shoes with relation to overhead wires, limiting said vertical adjustment by means of a torsion stop bar affixed to the collar of the sleeve bearing and extending between torsion control lugs affixed to the nonrotatable portion of the sleeve bearing assembly.

JERRY E. TONG.
MIKE McBILES.

REFERENCES CITED

The following references are of record in the file of this patent:

UNITED STATES PATENTS

| Number | Name | Date |
| --- | --- | --- |
| 887,691 | Potter | May 12, 1908 |
| 1,416,045 | Matthes | May 16, 1922 |
| 1,509,521 | Matthes | Sept. 23, 1924 |

FOREIGN PATENTS

| Number | Country | Date |
| --- | --- | --- |
| 12,211 | Great Britain | 1897 |
| 24,016 | Great Britain | Oct. 1909 |